(12) United States Patent
Harris

(10) Patent No.: US 7,954,308 B2
(45) Date of Patent: Jun. 7, 2011

(54) FREQUENCY OF CLIP ADJUSTMENT SYSTEM AND METHOD FOR REEL MOWER CUTTING UNIT

(75) Inventor: Troy W. Harris, Charlotte, NC (US)

(73) Assignee: Deere & Company, Moline, IL (US)

( * ) Notice: Subject to any disclaimer, the term of this patent is extended or adjusted under 35 U.S.C. 154(b) by 531 days.

(21) Appl. No.: 12/020,245

(22) Filed: Jan. 25, 2008

(65) Prior Publication Data

US 2009/0188225 A1 Jul. 30, 2009

(51) Int. Cl.
*A01D 34/47* (2006.01)
*A01D 69/00* (2006.01)

(52) U.S. Cl. ................................ 56/10.2 H; 56/11.9
(58) Field of Classification Search .............. 56/10.2 R, 56/10.2 G, 10.2 H, 10.5, 10.6, 10.8, 11.1, 56/11.9, 249, 294
See application file for complete search history.

(56) References Cited

U.S. PATENT DOCUMENTS

| | | | | |
|---|---|---|---|---|
| 4,560,959 A | * | 12/1985 | Rokos et al. | ................. 331/176 |
| 5,394,678 A | | 3/1995 | Lonn et al. | |
| 5,406,778 A | * | 4/1995 | Lamb et al. | .......................... 56/7 |
| 5,794,422 A | * | 8/1998 | Reimers et al. | ................. 56/11.9 |
| 6,082,084 A | * | 7/2000 | Reimers et al. | ................. 56/11.9 |
| 6,487,837 B1 | | 12/2002 | Fillman et al. | |
| 6,523,334 B1 | | 2/2003 | Dettmann | |
| 6,591,593 B1 | * | 7/2003 | Brandon et al. | ................. 56/10.6 |
| 6,758,030 B2 | | 7/2004 | Dettmann | |
| 6,802,175 B2 | | 10/2004 | Fillman et al. | |
| 7,007,446 B2 | | 3/2006 | Dettmann | |
| 7,168,227 B2 | | 1/2007 | Derby et al. | |
| 7,265,607 B1 | * | 9/2007 | Rajapandian et al. | ........ 327/541 |
| 7,367,173 B2 | * | 5/2008 | Daly et al. | ................. 56/10.2 R |
| 7,434,642 B2 | * | 10/2008 | Dettmann | .................... 180/68.5 |
| 7,610,738 B2 | * | 11/2009 | Daly et al. | ................. 56/10.2 R |
| 7,610,975 B1 | * | 11/2009 | Gust et al. | ................. 180/65.245 |
| 7,677,017 B2 | * | 3/2010 | Holby | ............................. 56/10.6 |
| 2005/0230168 A1 | * | 10/2005 | Fillman et al. | ................. 180/200 |
| 2006/0288680 A1 | * | 12/2006 | Holby | ............................. 56/11.9 |
| 2007/0107400 A1 | * | 5/2007 | Derby et al. | ................. 56/10.2 G |

* cited by examiner

*Primary Examiner* — Thomas B Will
*Assistant Examiner* — Joan D Misa

(57) ABSTRACT

A system and method for adjusting the frequency of clip for a reel mower cutting unit includes an operator interface outputting a voltage corresponding to a frequency of clip setting, and a reel motor controller calculating a travel speed of the reel mower cutting unit based on a voltage reading from a voltage bus and a scale factor applied to the voltage reading, and calculating a required reel speed based on the travel speed, the voltage corresponding to the frequency of clip setting, and the number of cutting blades of the reel mower cutting unit.

7 Claims, 3 Drawing Sheets

FREQUENCY OF CLIP ADJUSTMENT SYSTEM AND METHOD FOR REEL MOWER CUTTING UNIT

FIELD OF THE INVENTION

This invention relates generally to reel mower cutting units, and specifically to a frequency of clip adjustment system and method for a reel mower cutting unit.

BACKGROUND OF THE INVENTION

Grass mowing machines for golf courses and other turf areas typically include one or more reel mower cutting units to provide an accurate, high quality cut. Each reel mower cutting unit includes a generally cylindrical reel that has a plurality of blades which rotate in close proximity to a stationary bedknife fixed with the frame of the cutting unit. Grass is cut by a shearing action between the bedknife and the rotation blades of the cutting reel.

Frequency of clip is generally measured by the distance the grass mowing machine travels forward before the next blade reaches the bedknife. Different climates, grasses and weather conditions require different clip frequency settings for ideal maintenance. In most cases, a single machine may be used to mow multiple areas on a golf course, but it is difficult and time consuming to adjust the clip frequency. A frequency of clip adjustment system is needed that allows an operator to quickly and easily adjust clip frequency during operation of the mowing machine.

Systems have been proposed to set rotational speed of a cutting reel based on certain variables. For example, U.S. Pat. No. 5,394,678 relates to an electronic control system for controlling rotational speed of a cutting reel using a look-up table having optimal settings for various heights of cut, walking speed input from a ground speed sensor, and the number of blades in the cutting reel.

Walk behind greensmowers typically include a ground engaging traction drum that propels the mower while mowing. The traction drum may be driven through a mechanical or hydraulic transmission connected to an internal combustion engine, electric motor, or other power source. Each reel cutting unit may be driven by a hydraulic or electric motor. For example, U.S. Pat. No. 7,168,227 relates to a walk behind greensmower having an electric motor for driving the cutting reel, having an output signal from the mower controller to an electric motor to vary the speed of the electric motor. However, it lacks an operator interface that allows an operator to easily control the frequency of clip while operating the mower.

SUMMARY OF THE INVENTION

The present invention provides a system and method for adjusting the clip frequency of a reel mower cutting unit during machine operation. The frequency of clip adjustment system includes an electric reel motor attached to the reel mower cutting unit for rotating a cutting reel at a plurality of different rotational speeds, an alternator rotatably driven by an internal combustion engine and connected to a voltage bus to provide a voltage based on the speed of the engine, a user interface having a plurality of frequency of clip settings, each setting corresponding to a voltage output, and a reel motor controller connected to the voltage bus and reading the voltage provided by the alternator, connected to the user interface and reading the voltage from the user interface, and connected to the electric reel motor and providing a rotational speed to the electric reel motor based on the alternator voltage, voltage output from the user interface, and other numerical constants specific to the reel mower cutting unit.

DESCRIPTION OF THE PREFERRED EMBODIMENT

Figure 1:
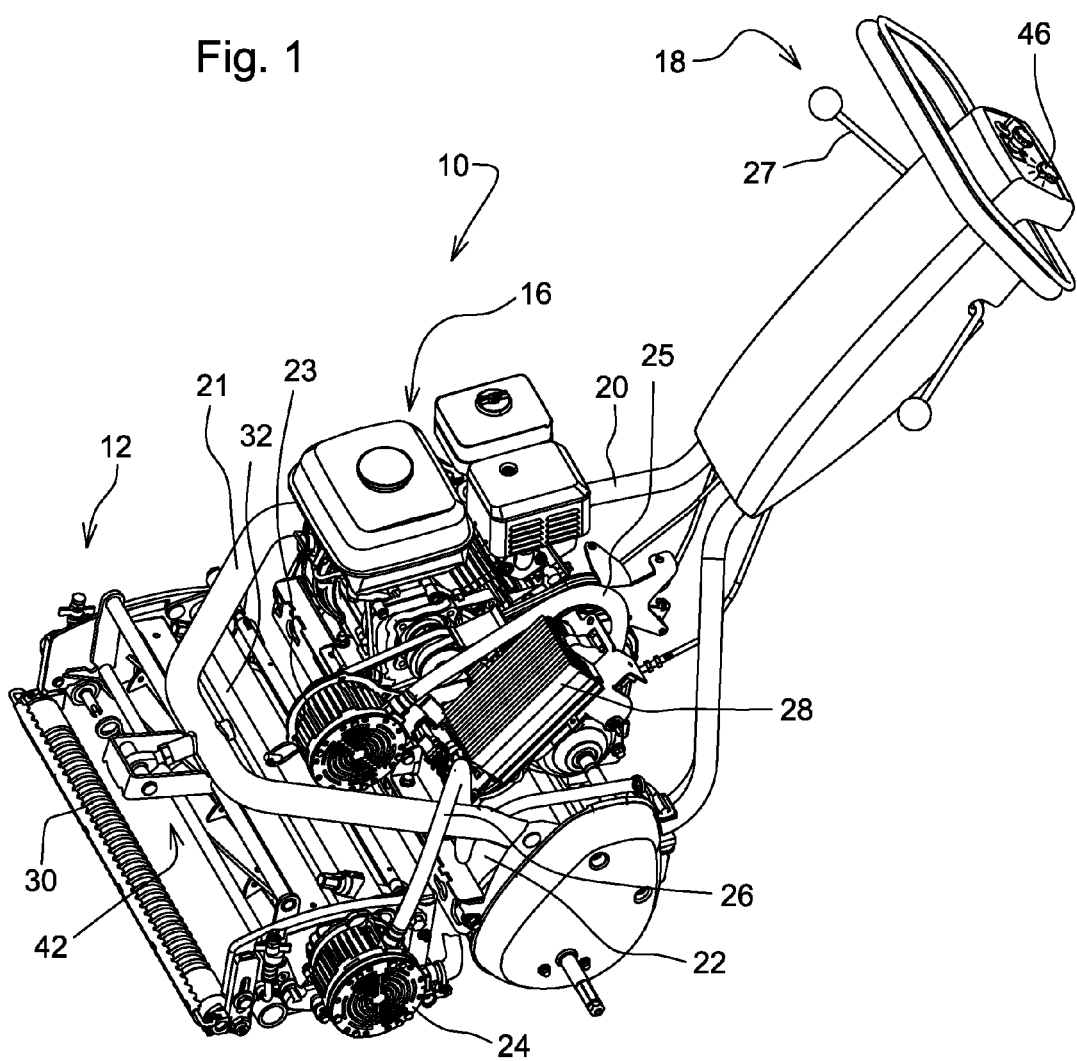
FIG. 1 is a perspective view of a walk behind greens mower with a reel mower cutting unit utilizing the system and method for adjusting clip frequency according to one embodiment of the invention.

In the embodiment of FIG. 1, walk behind greensmower 10 is shown having reel mower cutting unit 12. The walk behind greensmower may be powered by internal combustion engine 16 or an alternative power source such as an electric battery and motor. The walk behind greensmower also includes handle assembly 18 and frame 20. The frame may include a forwardly extending U-shaped frame member 21. The frame may be supported, at least in part, by traction drum 22 operably coupled to the engine and rotated to move the machine forward during mowing operations. The drive system may include one or more pulleys and/or gears between the engine and traction drum.

In one embodiment, the engine may be coupled by a pulley and belt arrangement, or other power transmission device, to alternator 23. During operation of the engine, the alternator may produce a voltage carried on voltage bus 25 that varies in relation to the engine speed. For example, the bus voltage may be between about 18 volts and about 70 volts. The operator may control the engine speed with throttle lever 27.

Although the system and method for adjusting frequency of clip is described for a walk behind greensmower, it will be understood by those skilled in the art that the system and method also may be used on any other grass mowing machine having one or more reel mower cutting units. For example, the system and method may be used for reel mower cutting units on triplex riding greensmowers, fairway mowers, and trim mowers.

In one embodiment, reel mower cutting unit 12 may be rotated by electric reel motor 24 mounted to the left or right side of the cutting unit. The electric reel motor may be connected via electric cable 26 to reel motor controller 28. In response to voltage output from the reel motor controller, the electric reel motor rotates the blades of cutting reel 34 about a generally horizontal and laterally extending axis. Grass may be cut between rotating reel blades of cutting reel 34 and a bedknife mounted between the side panels.

In one embodiment, the reel mower cutting unit may be supported by non-powered front and rear rollers 30, 32 coupled to the side panels and contacting the ground during mowing operations. The front and rear rollers may be adjusted up or down to change the cutting height. Yoke 42 may extend forwardly of the cutting unit, pulling the cutting unit during mowing operations, allowing the cutting unit to follow the contours of the ground surface and cut grass at a specified height.

Figure 2:
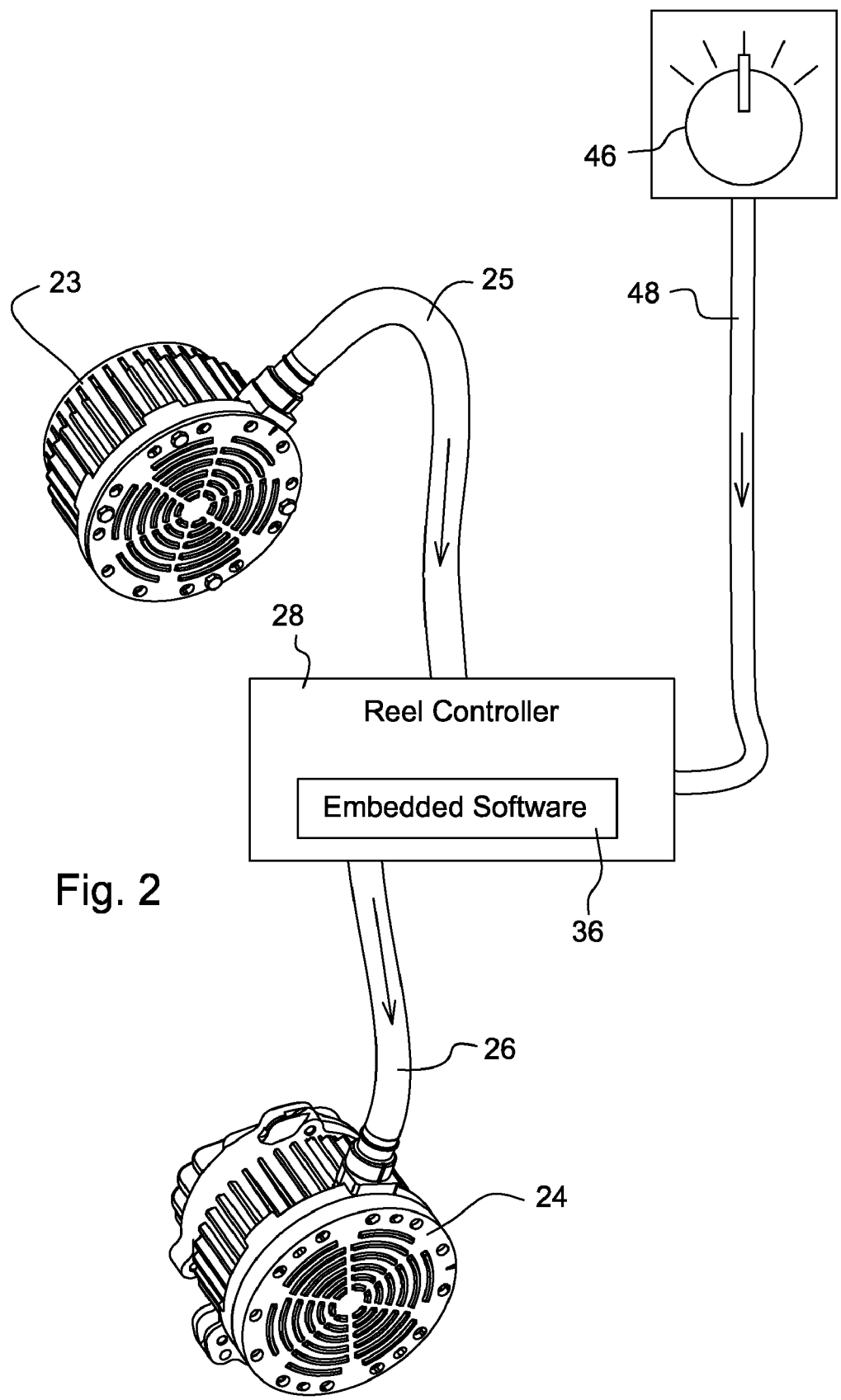
FIG. 2 is a schematic diagram of a system for adjusting clip frequency of a reel mower cutting unit in one embodiment of the invention.

As shown in FIG. 2, a preferred embodiment of a system for adjusting frequency of clip of a reel mower cutting unit includes reel motor controller 31 mounted on a grass mowing machine. The reel motor controller may have one or multiple analog and digital inputs including voltage bus 25 from alternator, one or multiple output drivers including output driver 26 to reel motor 24, and embedded software 36 which can implement the steps of the frequency of clip adjustment system.

In one embodiment, frequency of clip user interface 46 provides a voltage input to the reel motor controller through vehicle harness 48. The frequency of clip user interface may be a knob, dial or switch that includes multiple settings for the frequency of clip. The user interface may provide several discrete frequency of clip settings, or may provide infinitely variable settings between a minimum and maximum frequency of clip.

In one embodiment, the user interface may be a potentiometer that can vary a voltage input to the reel motor controller. For example, the operator may use the user interface to specify one of multiple frequency of clip settings between about 0.16 inches and about 0.48 inches for an eleven blade reel, or between about 0.25 inches and about 0.75 inches for a seven blade reel. Each frequency of clip setting selected by the operator may specify a corresponding voltage input of between about 1 volt and about 5 volts that is provided to the reel motor controller.

Figure 3:
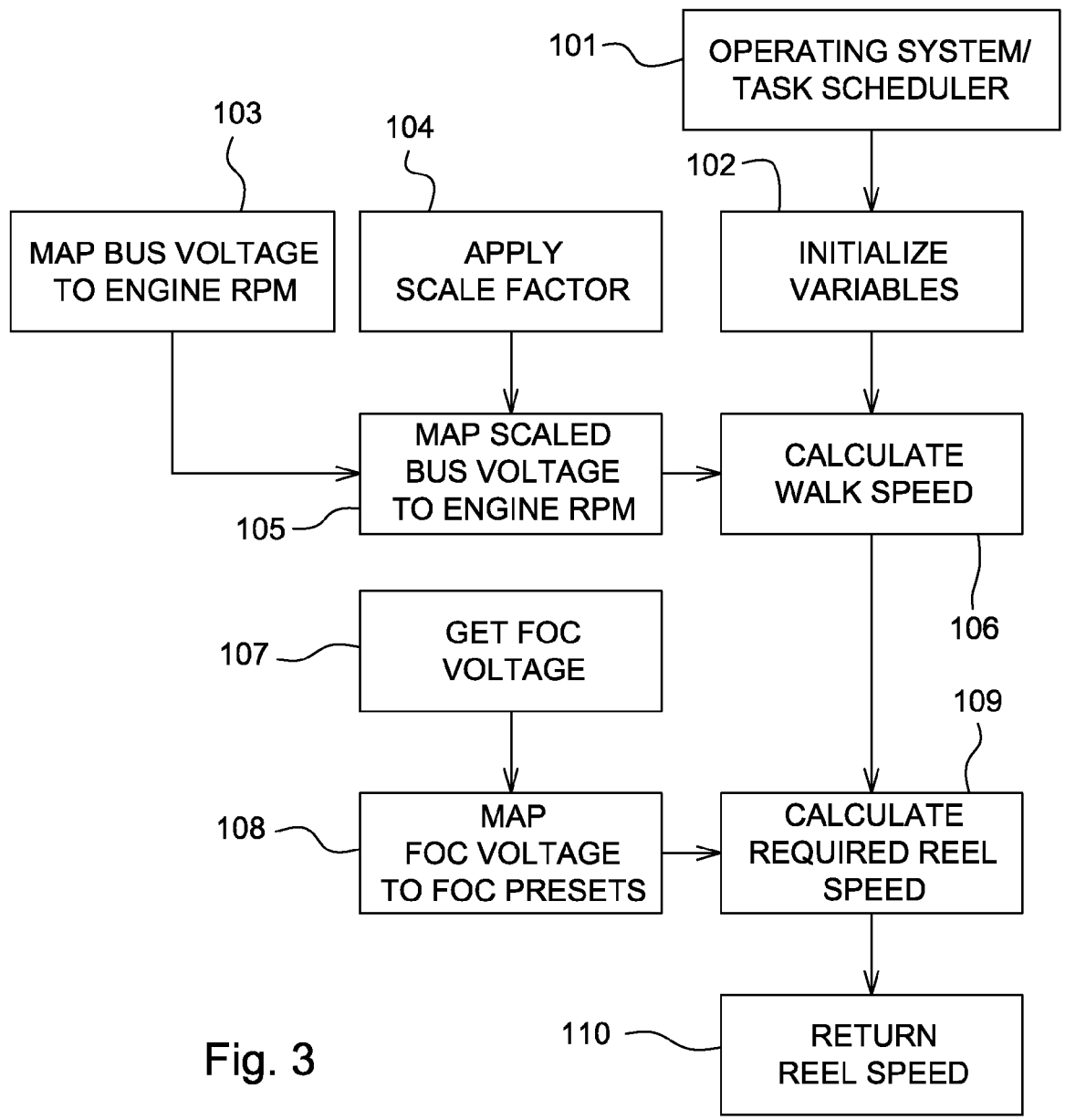
FIG. 3 is a block diagram of software for a system and method for adjusting clip frequency of a reel mower cutting unit according to a preferred method of the present invention.

Now referring to FIG. 3, embedded software that may be used to implement the frequency of clip adjustment system and method are shown in block diagram form. In block 101, the operating system/task scheduler specifies when the controller shall run the frequency of clip system at each clock cycle or periodic interval during machine operation, such as every 50 milliseconds. In block 102, variables of the system are initialized, including but not limited to engine to roller ratio, walk speed, reel speed and engine speed.

In block 103, the reel motor controller reads the alternator voltage on voltage bus 25. For example, each bus voltage reading may be between about 18 volts and about 70 volts.

In block 104, a scale factor for reel load may be applied to the actual or new bus voltage reading from block 103. The scale factor may reduce the effect of any sudden and/or very brief voltage changes which do not indicate a sustained change in the load on the engine and/or alternator. However, if the reel mower encounters an increased load for a sustained period, such as heavy and thick grass or a steep incline, the actual or new voltage reading will be used.

For example, the scale factor may compare each new voltage bus reading to one or more prior voltage bus readings. If the actual or new voltage bus reading is not greatly different from one or more prior readings, indicating changes in the voltage bus reading are sustained, a scale factor of 1 may be used. However, if the actual or new voltage bus reading has greatly increased or decreased from a previous reading(s), a scale factor may be applied. For example, if the actual or new voltage bus reading is at least 10% higher than the previous reading, the scale factor may be a ratio of the old voltage bus reading to the actual or new reading. The scale factor may be applied to reduce the actual or new voltage bus reading. Conversely, if the actual or new voltage bus reading is at least 10% lower than the previous reading, the scale factor may be a ratio of the actual or new voltage bus reading to the previous reading. The scale factor may be applied to increase the actual or new voltage bus reading.

In one embodiment, in block 105, the controller maps the scaled bus voltage to a table which identifies the engine speed or rpm for each such voltage. In block 106, the controller calculates the travel speed of the machine. In the case of a walk behind greensmower, the travel speed of the machine also may be referred to as the walk speed. The walk speed of a walk behind greensmower in miles per hour may be calculated based on the engine speed determined in block 105, and other numerical constants specific to the reel mower cutting unit, using the following equation:

$$((\text{ENGINE RPM/ENGINE TO TRACTION DRUM RATIO}) \times \text{ROLLER CIRCUMFERENCE} \times 60)/63360$$

The engine to traction drum ratio and roller circumference may be numerical constants stored in the reel motor controller. The engine to traction drum ratio for a walk behind greensmower is typically between about 10 and about 30, based on the diameter of the traction drum, the engine crank pulley, gearbox pulley, and traction drum output shaft.

For example, if the engine speed of a walk behind greensmower is determined to be 2000 rpm in block 104, the traction drum has a 23.56 inch circumference, and the engine to traction drum ratio is 19.68, the walk speed may be calculated as follows:

$$((2000 \text{ rpm}/19.68) \times 23.56 \text{ inches} \times 60 \text{ minutes per hour})/63360 \text{ inches per mile} = 2.26 \text{ mph}$$

In block 107, a frequency of cut setting may be a voltage output provided by the user interface to the reel motor controller. For example, the user interface may include a potentiometer that can vary the voltage provided to the reel motor controller between a maximum of about 5 volts and a minimum of about 1 volt. In block 108, the reel motor controller uses the voltage output reading from the user interface in block 107 to specify the frequency of clip setting.

In one embodiment, the reel motor controller may map the voltage output from the user interface to one of several frequency clip presets. For example, an eleven blade cutting reel may have five or more presets between about 0.16 inches and about 0.48 inches for the minimum and maximum voltage signals from the user interface. Similarly, a seven blade cutting reel may have five or more presets between about 0.251 inches and about 0.754 inches for the minimum and maximum voltage signals. Alternatively, the frequency of clip may be infinitely variable between maximum and minimum settings.

In block 109, the reel motor controller determines the required reel speed based on the walk speed calculated in block 106, the frequency of clip setting specified in block 108, and one or more other numerical constants specific to the reel mower cutting unit, including but not limited to the number of reel blades on the cutting unit. For example, the required reel speed of a walk behind greensmower in miles per hour may be calculated using the following equation:

$$((63360/60) \times \text{WALK SPEED})/(\text{NUMBER OF REEL BLADES} \times \text{FREQUENCY OF CUT})$$

The number of reel blades may be a constant stored in the reel motor controller and/or input by the operator. If the walk speed of a walk behind greensmower is determined in block 106 to be 2.26 mph, the cutting unit has 7 reel blades, and the operator specifies a frequency of cut of 0.425 inches, the required reel speed may be calculated as follows:

$$((63360 \text{ inches per mile}/60 \text{ seconds per minute}) \times 2.26 \text{ mph})/(7 \times 0.425 \text{ inches}) = 802 \text{ rpm}$$

In block 210, the reel motor controller returns a reel speed signal to the reel motor. For example, the reel speed output may be between about 20 volts and about 60 volts.

Having described a preferred embodiment, it will become apparent that various modifications can be made without departing from the scope of the invention as defined in the accompanying claims.

The invention claimed is:

1. A frequency of clip adjustment system for a reel mower cutting unit, comprising:
an electric reel motor attached to the reel mower cutting unit for rotating a cutting reel at a plurality of different rotational speeds;
an alternator rotatably driven by an internal combustion engine and connected to a voltage bus to provide a voltage based on the speed of the engine;
a user interface having a plurality of frequency of clip settings, each setting corresponding to a voltage output; and
a reel motor controller connected to the voltage bus and reading the voltage provided by the alternator, connected to the user interface and reading the voltage from the user interface, and connected to the electric reel motor and providing a rotational speed to the electric reel motor based on the alternator voltage, voltage output from the user interface, an engine to traction roller ratio, a traction roller circumference and number of blades of the cutting reel.

2. The frequency of clip adjustment system of claim 1 wherein the user interface has a plurality of discrete frequency of clip settings, each setting corresponding to a voltage.

3. The frequency of clip adjustment system of claim 1 further comprising a table stored in reel motor controller mapping the voltage reading on the voltage bus to an engine speed.

4. The frequency of clip adjustment system of claim 3 further comprising a scale factor applied to the voltage reading on the voltage bus based on the difference between the voltage reading and at least one previous voltage reading.

5. A frequency of clip adjustment method for a reel mower cutting unit comprising the steps of:
reading a voltage on a voltage bus;
mapping the voltage to an engine speed;
calculating a travel speed of the reel mower cutting unit based on the engine speed, a traction drum circumference and an engine to traction drum ratio;
reading a voltage provided by an operator interface corresponding to a frequency of clip setting selected by an operator on the operator interface; and
calculating the required reel speed based on the travel speed, the frequency of clip setting, and number of reel blades of the reel mower cutting unit.

6. The frequency of clip adjustment method of claim 5 further comprising the step of applying a scale factor to the voltage on the voltage bus, the scale factor based at least in part on the difference between the voltage and at least one previous voltage on the voltage bus.

7. The frequency of clip adjustment method of claim 5 further comprising mapping the voltage provided by the operator interface to one of a plurality of discrete frequency of cut settings.

* * * * *